United States Patent
Zhang et al.

(10) Patent No.: US 7,470,650 B2
(45) Date of Patent: *Dec. 30, 2008

(54) SHOCK ABSORBER FLUID COMPOSITION CONTAINING NANOSTRUCTURES

(75) Inventors: Zhiqiang Zhang, Lexington, KY (US); Gefei Wu, Lexington, KY (US); Frances E. Lockwood, Georgetown, KY (US); Daniel J. Dotson, Lexington, KY (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 812 days.

This patent is subject to a terminal disclaimer.

(21) Appl. No.: 10/966,825

(22) Filed: Oct. 15, 2004

(65) Prior Publication Data

US 2006/0040832 A1 Feb. 23, 2006

Related U.S. Application Data

(60) Provisional application No. 60/512,477, filed on Oct. 15, 2003.

(51) Int. Cl.
*C10M 125/02* (2006.01)
(52) U.S. Cl. ............... 508/113; 508/116; 508/117; 508/482; 508/491; 516/32
(58) Field of Classification Search ............... 508/113, 508/116
See application file for complete search history.

(56) References Cited

U.S. PATENT DOCUMENTS

| | | | |
|---|---|---|---|
| 3,859,130 A | 1/1975 | Parker et al. | |
| 4,054,295 A | 10/1977 | Elliott | |
| 4,541,787 A | 9/1985 | DeLong | |
| 4,692,673 A | 9/1987 | DeLong | |
| 4,992,190 A | 2/1991 | Shtarkman | |
| 5,167,850 A | 12/1992 | Shtarkman | |
| 5,523,006 A * | 6/1996 | Strumban | 508/150 |
| 5,705,085 A | 1/1998 | Munoz et al. | |
| 5,749,807 A | 5/1998 | Webb | |
| 5,810,696 A | 9/1998 | Webb | |
| 5,921,357 A | 7/1999 | Starkovich et al. | |
| 5,985,168 A | 11/1999 | Phule | |
| 6,395,193 B1 | 5/2002 | Kintz et al. | |
| 6,426,157 B1 | 7/2002 | Hokkyo et al. | |
| 6,475,404 B1 | 11/2002 | Carlson | |
| 6,547,983 B2 | 4/2003 | Iyengar | |
| 6,599,439 B2 | 7/2003 | Iyengar et al. | |

(Continued)

*Primary Examiner*—Ellen M. McAvoy
(74) *Attorney, Agent, or Firm*—Wood, Herron & Evans, L.L.P.

(57) ABSTRACT

The introduction of nanostructures in a liquid provides a means for changing the physical and/or chemical properties of the liquid. Improvements in heat transfer, electrical properties, viscosity, and lubricity can be realized upon dispersion of nanotubes in liquids. Stable dispersions of nanostructures are described and surfactants/dispersants are identified which can disperse nanostructures in petroleum liquid medium. The appropriate dispersant is chosen for the selected nanostructure material and the oil based medium and the dispersant is dissolved into the liquid medium to form a solution. The nanostructure is added to the dispersant containing the solution with agitation, ultrasonication, and/or combinations thereof. Nanostructures dispersed in a fluid form a nanofluid utilized as a shock absorber oil whereby the nanostructures serve to improve the viscosity index of the fluid or more particularly the shock absorber oil in the form of a lubricant additive.

4 Claims, 1 Drawing Sheet

U.S. PATENT DOCUMENTS

| | | | |
|---|---|---|---|
| 6,783,746 B1 * | 8/2004 | Zhang et al. | 423/447.1 |
| 6,818,143 B2 * | 11/2004 | Iyengar | 252/62.52 |
| 6,828,282 B2 * | 12/2004 | Moy et al. | 508/109 |
| 6,878,676 B1 * | 4/2005 | Migdal et al. | 508/230 |
| 7,109,247 B2 * | 9/2006 | Baran, Jr. et al. | 516/31 |
| 7,129,277 B2 * | 10/2006 | Baran, Jr. | 516/22 |
| 7,217,683 B1 * | 5/2007 | Blanski et al. | 508/208 |
| 2001/0032961 A1 | 10/2001 | Iyengar | |
| 2001/0045540 A1 | 11/2001 | Iyengar | |
| 2002/0171067 A1 | 11/2002 | Jolly et al. | |
| 2003/0071238 A1 | 4/2003 | Kintz et al. | |
| 2003/0209687 A1 | 11/2003 | Iyengar | |

* cited by examiner

SHOCK ABSORBER FLUID COMPOSITION CONTAINING NANOSTRUCTURES

This application claims priority from U.S. Provisional Application Ser. No. 60/512,477 filed on Oct. 15, 2003 which is incorporated by reference herein.

BACKGROUND OF THE INVENTION

1. Technical Field

A composition containing nanostructures is utilized in shock absorber applications. The method of dispersing the nanostructures together with at least some preferred surfactants are identified which can disperse carbon nanotubes in petroleum liquid medium utilizing selected dispersants and mixing methods to form stable carbon nanostructure fluid dispersions.

2. Description of the Prior Art

The term "nanostructure" refers to elongated structures, tubes, particles, rods, spheres, strands, and combinations thereof having a cross section (e.g., angular fibers having edges) or diameter (e.g., rounded) less than 1 micron. The structure may be either hollow or solid. Accordingly, the term includes "nanofibrils" and "bucky tubes". Such structures provide significant surface area when incorporated into a structure because of their size and shape. Moreover, such fibers can be made with high purity and uniformity. Preferably, the nanostructures used in the present invention has a diameter less than 1 micron, preferably less than about 0.5 micron, and even more preferably less than 0.1 micron and most preferably less than 0.05 micron. Dispersing the nanotubes into organic medium has been a serious challenge. The nanotubes tend to aggregate, form agglomerates, and separate from the dispersion. me industrial applications require a method of preparing a stable dispersion of a selected carbon nanostructure in a liquid medium.

For instance, U.S. Pat. No. 5,523,006 by Strumban teaches the user of a surfactant and an oil medium; however, the particles are Cu—Ni—Sn—Zn alloy particles with the size from 0.01 micron and the suspension is stable for a limited period of time of approximately 30 days. Moreover, the surfactants don't include the dispersants typically utilized in the lubricant industry.

U.S. Pat. No. 5,560,898 by Uchida et al. teaches that a liquid medium is an aqueous medium containing a surfactant; however, the stability of the suspension is of little consequence in that the liquid is centrifuged upon suspension.

U.S. Pat. No. 5,853,877 by Shibuta teaches dispersing disentangled nanotubes in a polar solvent and forming a coating composition with additives such as dispersing agents; however, a method of obtaining a stable dispersion is not taught.

U.S. Pat. No. 6,099,965 by Tennent et al. utilizes a kneader teaching mixing a dispersant with other reactants in a liquid medium using a high-torque dispersing tool, yet sustaining the stability of the dispersion does not appear to be taught nor suggested.

None of the conventional methods taught provide a process for dispersing and maintaining nanostructures in suspension comprising a lubricant additive for use in a shock absorber nanofluid composition as described and claimed in the instant invention.

SUMMARY OF THE INVENTION

The present invention provides a method of preparing a stable dispersion of a selected carbon nanostructure in a liquid medium, such as water or any water based solution, or oil, with the combined use of surfactants and agitation (e.g. ultrasonication) or other means of agitation. The nanostructure can be either single-walled, or multi-walled, with typical aspect ratio of 500-5000; however, it is contemplated that nanostructures of other configurations can also be utilized with the instant invention. The nanostructures may comprise fibrils, nanotubes, nanoparticles, and combinations thereof. The nanoparticles can be any metal from the Group IV elements, such as carbon materials (carbon nanotubes, fullerenes, graphite, amorphous carbon, etc.), silicone carbide, and clay materials, metal (including transition metals) particles (such as silver, copper, aluminum, etc.), metal oxides, alloy particles, and combinations thereof. It is contemplated that a mixture containing nanostructures having a length of 1 micron or more and a diameter of 50 nm or less. The raw material may contain nanostructures having a size outside of the above ranges. The nanostructure is not required to be surface treated providing a hydrophilic surface for dispersion, but optionally may be treated. The selected surfactant is soluble or dispersible in the liquid medium.

The term "surfactant" in the instant invention refers to any chemical compound that reduces surface tension of a liquid when dissolved into it, or reduces interfacial tension between two liquids, or between a liquid and a solid. It is usually, but not exclusively, a long chain molecule comprised of two moieties: a hydrophilic moiety and a lipophilic moiety. The "hydrophilic" and "lipophilic" moieties refer to the segment in the molecule with affinity for water, and that with affinity for oil, respectively. It is a broad term that covers all materials that have surface activity, including wetting agents, dispersants, emulsifiers, detergents and foaming agents, etc. The term "dispersant" in the instant invention refers to a surfactant added to a medium to promote uniform suspension of extremely fine solid particles, often of colloidal size. In the lubricant industry the term "dispersant" is general accepted to describe the long chain oil soluble or dispersible compounds which function to disperse the "cold sludge" formed in engines. These two terms are mostly interchangeable in the instant invention; however, in some cases the term "dispersant" is used with the tendency to emphasize, but not restrict to, the ones commonly used in the lubricant industry.

The method of making a stable particle-containing dispersions includes physical agitation in combination with chemical treatments. The physical mixing includes high shear mixing, such as with a high speed mixer, homogenizers, microfluidizers, a Kady mill, a colloid mill, etc., high impact mixing, such as attritor, ball and pebble mill, etc., and ultrasonication methods. The mixing methods are further aided by electrostatic stabilization by electrolytes, and steric stabilization by polymeric surfactants (dispersants).

The chemical treatment and the use of the claimed surfactants/dispersants are critical to long term stability of the nanostructure fluid mixtures. The treatment involves dissolving a selected dispersant into a selected liquid medium. The chemical method includes a two-step approach: dissolving the dispersant into the liquid medium, and then adding the selected carbon nanostructure into the dispersant liquid medium mixture with mechanical agitation and/or ultrasonication. These steps can be reversed but may not produce as satisfactory a result. The liquid medium can be a petroleum distillate, a petroleum oil, synthetic oil, or vegetable oil and any other oil. The dispersant for the oily liquid medium is a surfactant with low hydrophile-lipophile balance (HLB) value (HLB<8) or a polymeric dispersant of the type used in the lubricant industry. It is preferably nonionic, or a mixture of nonionics and ionics. The uniform dispersion of nanostructures is obtained with a designed viscosity in the liquid medium. The dispersion of nanostructures may be obtained in the form of a paste, gel or grease, in either a petroleum liquid medium.

This dispersion may also contain a large amount of one or more other chemical compounds, preferably polymers, not for the purpose of dispersing, but to achieve thickening or other desired fluid characteristics.

It is an object of the present invention to provide a method of preparing a stable dispersion of the carbon nanostructure in a liquid medium with the combined use of dispersants and physical agitation.

It is another object of the present invention to utilize a nanostructure, that is either single-walled, or multi-walled, with typical aspect ratio of 500-5000.

It is another object of the present invention to utilize carbon nanostructures which may optionally be surface treated to be hydrophilic at surface for ease of dispersing into the medium.

It is another object of the present invention to utilize a dispersant that is soluble for a selected liquid medium.

It is another object of the present invention to utilize a method of preparation dissolving the dispersant into the liquid medium first, and then adding the carbon nanostructure into the mixture while being strongly agitated or ultrasonicated.

It is another object of the present invention to add the carbon nanostructure into the liquid while being agitated or ultrasonicated, and then adding the surfactant.

It is another object of the present invention to utilize a petroleum distillate or a synthetic petroleum oil as the liquid medium.

It is another object of the present invention to utilize a liquid medium of the type used in the lubricant industry, or a surfactant, or a mixture of surfactants with a low HLB (<8), preferably nonionic or mixture of nonionic and ionic surfactant. More typically, the dispersant can be the ashless polymeric dispersant used in the lubricant industry.

It is another object of the present invention to utilize a dispersant-detergent (DI) additive package typical sold in the lubricant industry as the surfactant/dispersant.

It is another object of the present invention to utilize a uniform dispersion with a designed viscosity having a nanostructure in petroleum liquid medium.

It is another object of the present invention to obtain a uniform dispersion in a form as a gel or paste containing nanostructures in petroleum liquid medium.

It is another object of the present invention to obtain a uniform dispersion of nanostructures in a form as a grease obtained from dispersing carbon nanostructure in petroleum liquid medium.

It is another object of the present invention to form a uniform and stable dispersion of carbon nanostructures containing dissolved non-dispersing, "other" compounds in the liquid oil based medium.

It is yet another object to use nanostructures in a nanofluid composition to enhance the viscosity index as a function of temperature when utilized as a lubricant additive in a shock absorber oil.

The foregoing and other objects and advantages of the invention will be set forth in or apparent from the following description.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
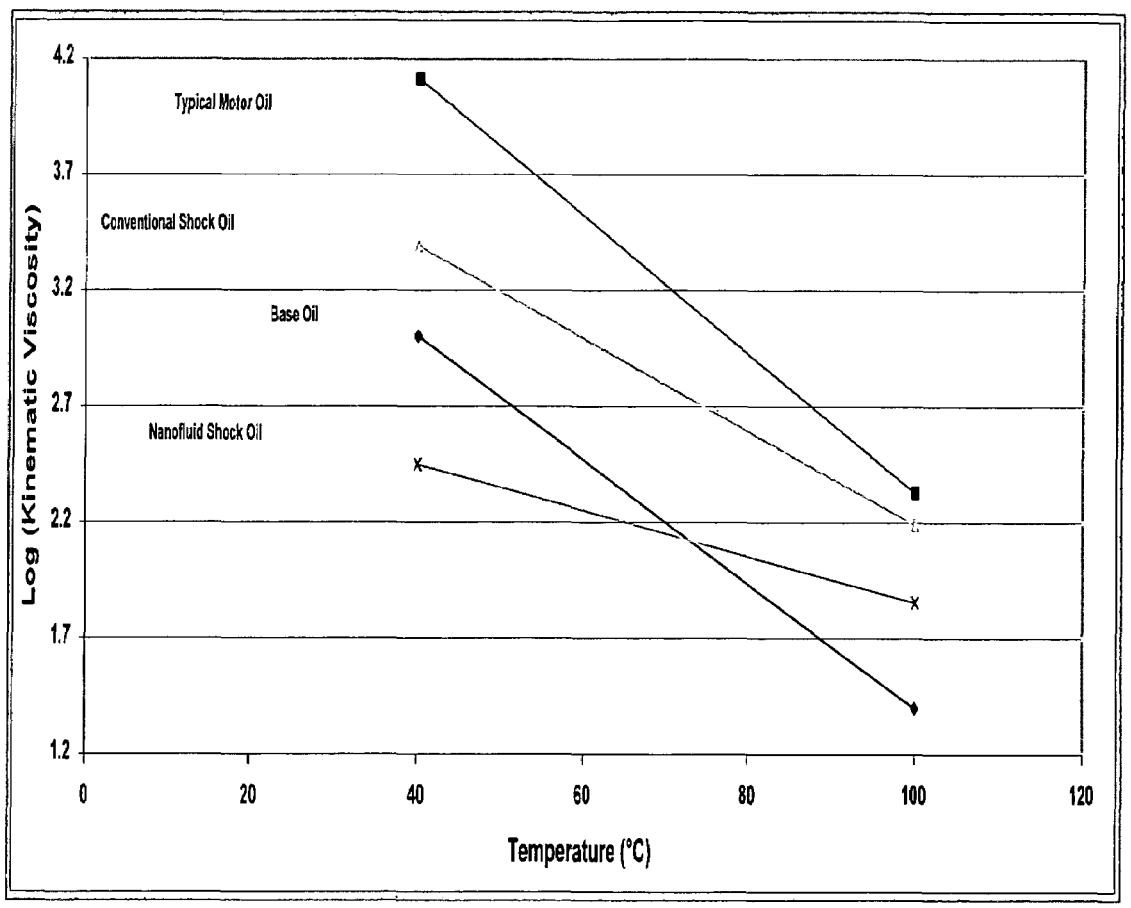
FIG. 1 is a graph illustrating the viscosity index of a nanofluid shock absorber oil is greater than that of a conventional shock absorber fluid without nanoparticles.

The present invention provides a method a dispersing nanostructures, preferably carbon nanostructures into a liquid medium and adding same to a shock absorber fluid As set forth above, the nanostructures can be either single-walled, or multi-walled, having a typical nanoscale diameter of 1-500 nanometers. More typically the diameter is around 10-30 nanometers. The length of the tube can be in submicron and micron scale, usually from 500 nanometers to 500 microns. More typical length is 1 micron to 100 microns. The aspect ratio of the tube can be from hundreds to thousands, more typical 500 to 5000.

The nanoparticles can be any metal from the Group IV elements, such as carbon materials (carbon nanotubes, fullerenes, graphite, amorphous carbon, etc.), silicone carbide, and clay materials, metal (including transition metals) particles (such as silver, copper, aluminum, etc.), metal oxides, alloy particles, and combinations thereof.

One of the most readily available nanostructures is carbon nanostructures. The carbon nanostructures, fibers, particles or combination thereof can be utilized as is from the production. The carbon nanostructures comprising carbon nanoparticles, carbon nanofibers, and combinations thereof can be utilized as a substrate in the present invention "as is" as a commercial product straight from a commercial production process. One preferred embodiment of the instant invention was obtained using a carbon nanostructure particle product having the surface treated chemically to achieve certain level of hydrophilicity by an activated carbon treatment. Moreover, a certain level of hydrophilicity can be achieved by utilizing a vapor disposition process using chemicals such as hydrogen sulfide; and/or by treatment with a strong acid or base.

One preferred embodiment utilized a carbon nanostructure product obtained from CARBOLEX at the University of Kentucky which contains amorphous carbon particles and which is believed to utilize an activated carbon treatment to improve the level of hydrophilicity. The CARBOLEX carbon nanostructures comprise single walled nanostructures, multi-wall nanostructures, and combinations thereof. Moreover, the combination can include small fractions of the carboneous materials made up of partially disordered spherical particles and/or short carbon nanostructures.

Petroleum Basestocks Liquid Medium

Preparation of nanostructures dispersed in an oil based medium is applicable to various types of natural and synthetic based oil products.

In general, a petroleum liquid medium can be any petroleum distillates or synthetic petroleum oils, greases, gels, or oil-soluble polymer composition. More typically, it is the mineral basestocks or synthetic basestocks used in the lube industry, e.g., Group I (solvent refined mineral oils), Group II (hydrocracked mineral oils), Group III (severely hydrocracked oils, sometimes described as synthetic or semi-synthetic oils), Group IV (polyalphaolefins), and Group VI (esters, naphthenes, and others). One preferred group includes the polyalphaolefins, synthetic esters, and polyalkylglycols.

Synthetic oil based products are incorporated into various automotive oil based products Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-octenes), poly(1-decenes), etc., and mixtures thereof; alkylbenzenes (e.g., dodecylbenzenes, tetradecylbenzenes, dinonylbenzenes, di-(2-ethylhexyl)benzenes, etc.); polyphenyls (e.g., biphenyls, terphenyls, alkylated polyphenyls, etc.), alkylated diphenyl, ethers and alkylated diphenyl sulfides and the derivatives, analogs and homologs thereof and the like. Alkylene oxide polymers and interpolymers and derivatives thereof where the terminal hydroxyl groups have been modified by esterification, etherification, etc. constitute another class of known synthetic oils.

Another class of synthetic oils comprise the esters of dicarboxylic acids (e.g., phtalic acid, succinic acid, alkyl succinic acids and alkenyl succinic acids, maleic acid, azelaic acid, suberic acid, sebacic acid, fumaric acid, adipic acid, alkenyl malonic acids, etc.) with a variety of alcohols (e.g., butyl alcohol, hexyl alcohol, dodecyl alcohol, 2-ethylhexyl alcohol, ethylene glycol diethylene glycol monoether, propylene glycol, etc.). Specific examples of these esters include dibutyl adipate, di(2-ethylhexyl) sebacate, di-hexyl fumarate, dioctyl sebacate, diisooctyl azelate, diisodecyl azealate, dioctyl phthalate, didecyl phthalate, dicicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc. Other synthetic oils include liquid esters of phosphorus-containing acids (e.g., tricresyl phosphate, trioctyl phosphate, diethyl ester of decylphosphonic acid, etc.), polymeric tetrahydrofurans and the like.

Preferred polyalphaolefins (PAO) useful as synthetic oils, include those sold by Mobil Chemical company as SHF fluids, and those sold by Ethyl Corporation under the name ETHYLFLO, or ALBERMARLE. PAO's include the Ethylflow series by Ethyl Corporation, "Albermarle Corporation," including ETHYL-FLOW 162, 164, 166, 168, and 174, having varying viscosity from about 2 to about 460 centistokes.

Mobil SHF-42 from Mobil Chemical Company, Emery 3004 and 3006, and Quantum Chemical Company provide additional polyalphaolefins basestocks. For instance, Emery 3004 polyalphaolefin has a viscosity of 3.86 centistokes (cSt) at 212° F. (100° C.) and 16.75 cSt at 104° F.(40° C.). It has a viscosity index of 125 and a pour point of −98° F. and it also has a flash point of 432° F. and a fire point of 478° F. Moreover, Emery 3006 polyalphaolefin has a viscosity of 5.88 cSt at +212° F. and 31.22 cSt at +104° F. It has a viscosity index of 135 and a pour point of −87° F. It also has a flash point of +464° F. and a fire point of +514° F.

Additional polyalphaolefins applicable to the automotive oil industry are those sold by Uniroyal Inc. under the brand Synton PAO-40, which is a 40 centistoke polyalphaolefin. Also useful are the Oronite brand polyalphaolefins manufactured by Chevron Chemical Company. It is contemplated that Gulf Synfluid 4 cSt PAO, commercially available from Gulf Oil Chemicals Company, a subsidiary of Chevron Corporation, which is similar in many respects to Emery 3004 may also be utilized for particular oil products containing nanostructures therein. Mobil SHF-41 PAO, commercially available from Mobil Chemical Corporation, is similar in many respects to Emery 3004. Preferably the polyalphaolefins will have a viscosity in the range of about 2-40 centistoke at 100° C., with viscosity of 4 and 10 centistoke being particularly preferred.

Some of the most preferred synthetic based oil ester additives are polyolesters and diesters such as di-aliphatic diesters of alkyl carboxylic acids such as di-2-ethylhexylazelate, di-isodecyladipate, and di-tridecyladipate, commercially available under the brand name Emery 2960 by Emery Chemicals, described in U.S. Pat. No. 4,859,352 to Waynick. Other suitable polyolesters are manufactured by Mobil Oil. Mobil polyolester P-43, M-045 containing two alcohols, and Hatco Corp. 2939 are particularly preferred.

Diesters and other synthetic oils have been used as replacements of mineral oil in fluid lubricants. Diesters have outstanding extreme low temperature flow properties and good residence to oxidative breakdown. The diester oil may include an aliphatic diester of a dicarboxylic acid, or the diester oil can comprise a dialkyl aliphatic diester of an alkyl dicarboxylic acid, such as di-2-ethyl hexyl azelate, di-isodecyl azelate, di-tridecyl azelate, di-isodecyl adipate, di-tridecyl adipate. For instance, Di-2-ethylhexyl azelate is commercially available under the brand name of Emery 2958 by Emery Chemicals. Also useful are polyol esters such as Emery 2935, 2936, and 2939 from Emery Group of Henkel Corporation and Hatco 2352, 2962, 2925, 2938, 2939, 2970, 3178, and 4322 polyol esters from Hatco Corporation, described in U.S. Pat. No. 5,344,579 to Ohtani et al. and Mobil ester P 24 from Mobil Chemical Company. Mobil esters such as made by reacting dicarboxylic acids, glycols, and either monobasic acids or monohydric alcohols like Emery 2936 synthetic-lubricant basestocks from Quantum Chemical Corporation and Mobil P 24 from Mobil Chemical Company can be used. Polyol esters have good oxidation and hydrolytic stability. The polyol ester for use herein preferably has a pour point of about −100° C. or lower to −40° C. and a viscosity of about 2-460 centistoke at 100° C.

Group III oils are often referred to as hydrogenated oil to be used as the sole base oil component with no other synthetic oil base or mineral oil base. A hydrogenated oil is a mineral oil subjected to hydrogenation or hydrocracking under special conditions to remove undesirable chemical compositions and impurities resulting in a mineral oil based oil having synthetic oil components and properties. Typically the hydrogenated oil is defined as a Group III petroleum based stock with a sulfur level less than 0.03, severely hydrotreatd and isodewaxed with saturates greater than or equal to 90 and a viscosity index of greater than or equal to 120.

The hydrogenated oil provides superior performance to conventional motor oils with having a mineral oil base. It is superior to mineral oil when used in combination with another conventional synthetic oil such as those containing polyalphaolefins or esters, or when used in combination with a mineral oil. In most automotive applications, the hydrogenated oil may be present in an amount of up to 95 percent by volume, more preferably from about 10 to 80 percent by volume, more preferably from 20 to 60 percent by volume and most preferably from 10 to 30 percent by volume of the base oil composition depending upon the application.

A Group I or II mineral oil basestock may be incorporated in selected oil product formulas as a portion of the concentrate or a basestock to which the concentrate may be added. Preferred as mineral oil basestocks are the ASHLAND 325 Neutral defined as a solvent refined neutral having a SABOLT UNIVERSAL viscosity of 325 SUS@ 100° F. and ASHLAND 100 Neutral defined as a solvent refined neutral having a SABOLT UNIVERSAL viscosity of 100 SUS@ 100° F., manufactured by the Marathon Ashland Petroleum.

Other acceptable petroleum-base fluid compositions useful in the automotive industry includes white mineral, paraffinic and NVI naphthenic oils having the viscosity range of about 20-400 centistokes. Preferred white mineral oils include those available from Witco Corporation, Arco Chemical Company, PSI and Penreco. Preferred paraffinic oils include solvent neutral oils available from Exxon Chemical Company, HVI neutral oils available from Shell Chemical Company, and solvent treated neutral oils available from Arco Chemical Company. Preferred MVI naphthenic oils include solvent extracted coastal pale oils available from Exxon Chemical Company, MVI extracted/acid treated oils available from Shell Chemical Company, and naphthenic oils sold under the names HydroCal and Calsol by Calumet, and described in U.S. Pat. No. 5,348,668 to Oldiges.

Vegetable oils may also be utilizes as an oil based liquid medium.

Of course the preferred base oil for the dispersion of the nanostructures in shock absorber fluid applications is conventional shock absorber fluid such as VISTA LPA 210 in an amount of up to 95% by weight of the total composition, and more preferably up to about 80% by weight based on the total weight of the composition.

Surfactants/Dispersants

Dispersants used in Lubricant Industry

Dispersants used in the lubricant industry are typically used to disperse the "cold sludge" formed in gasoline and diesel engines, which can be either "ashless dispersants", or containing metal atoms. They can be used in the instant invention since they have been found to be an excellent dispersing agent for soot, an amorphous form of carbon particles generated in the engine crankcase and incorporated with dirt and grease.

The ashless dispersants commonly used in the automotive industry contain an lipophilic hydrocarbon group and a polar functional hydrophilic group. The polar functional group can be of the class of carboxylate, ester, amine, amide, imine, imide, hydroxyl, ether, epoxide, phosphorus, ester carboxyl, anhydride, or nitrile. The lipophilic group can be oligomeric or polymeric in nature, usually from 70 to 200 cabon atoms to ensure oil solubility. Hydrocarbon polymers treated with various reagents to introduce polar functions include products prepared by treating polyolefins such as polyisobutene first with maleic anhydride, or phosphorus sulfide or chloride, or by thermal treatment, and then with reagents such as polyamine, amine, ethylene oxide, etc.

Of these ashless dispersants the ones typically used in the petroleum industry include N-substitued polyisobutenyl succinimides and succinates, allkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides. Preferred oil-based dispersants that are most important in the instant application include dispersants from the chemical classes of alkylsuccinimide, succinate esters, high molecular weight amines, Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, bishydroxypropyl phosphorate. The dispersant may be combined with other additives used in the lubricant industry to form a "dispersant-detergent (DI)" additive package, e.g., Lubrizol™ 9802A, and the whole DI package can be used as dispersing agent for the nanostructure suspension.

For instance, LUBRIZOL 9802A is described in the technical brochure (MATERIAL SAFETY DATA SHEET No. 1922959-1232446-3384064) by The Lubrizol Corporation in Wickliffe, Ohio and is hereby incorporated by reference. LUBRIZOL 9802A is described as a motor oil additive is believed to contain as an active ingredient a zinc dithiophosphate and/or zinc alkyldithiophosphate.

LUBRIZOL 4999 is described in its Technical Brochure (MATERIAL SAFETY DATA SHEET No. 1272553-1192556-3310026) by the Lubrizol Corporation in Wickliffe, Ohio and is hereby incorporated by reference. LUBRIZOL 9802A is described as a engine oil additive and contains as an active ingredient from 5 to 9.9 percent of a zinc alkyldithiophosphate.

LUBRIZOL 7720C in amounts of about 40% and LUBRIZOL 5186B in amounts of up to about 1% are especially useful for shock absorber nanofluids containing nanostructures.

OLOA 9061 is described in Technical Brochure "MATERIAL SAFETY DATA SHEET No. 006703" by Chevron Chemical Company LLC and is hereby incorporated by reference. OLOA 9061 is described as zinc alkyl dithiophosphate compound.

IGEPAL CO-630 is described in Technical Brochure "MATERIAL SAFETY DATA SHEET" from Rhodia Inc. and is hereby incorporated by reference. IGEPAL CO-630 is described as a nonylphenoxy poly(ethyleneoxy) ethanol, branched compound.

Other Types of Dispersants

Alternatively a surfactant or a mixture of surfactants with low HLB value (typically less than or equal to 8), preferably nonionic, or a mixture of nonionics and ionics, may be used in the instant invention. The dispersants selected should be soluble or dispersible in the liquid medium.

The dispersant can be in a range of up from 0.001 to 30 percent, more preferably in a range of from between 0.5 percent to 20 percent, more preferably in a range of from between 1.0 to 8.0 percent, and most preferably in a range of from between 2 to 6 percent. The carbon nanostructure can be of any desired weight percentage in a range of from 0.0001 up to 50 percent. For practical application it is usually in a range of from between 0.01 percent to 2 percent, and most preferably in a range of from between 0.05 percent to 0.5 percent. The remainder of the dispersant is the selected oil medium.

It is believed that in the instant invention the dispersant functions by adsorbing onto the surface of the carbon nanostructure. The dispersant contains a hydrophilic segment and a hydrophobic segment which surrounds the carbon particles thereby providing a means for isolating and dispersing the carbon particles. The selection of a dispersant having a particular HLB value is important to determine the dispersant characteristics such as rate and the degree of stabilization over time.

Other Chemical Compound Additives

This dispersion may also contain a large amount of one or more other chemical compounds, preferably polymers, not for the purpose of dispersing, but to achieve thickening or other desired fluid characteristics.

The viscosity improvers used in the lubricant industry in the automotive oil based fluid applications include olefin copolymers (OCP), polymethacrylates (PMA), hydrogenated styrene-diene (STD), and styrene-polyester (STPE) polymers. Olefin copolymers are rubber-like materials prepared from ethylene and propylene mixtures through vanadium-based Ziegler-Natta catalysis. Styrene-diene polymers are produced by anionic polymerization of styrene and butadiene or isoprene. Polymethacrylates are produced by free radical polymerization of alkyl methacrylates. Styrene-polyester polymers are prepared by first co-polymerizing styrene and maleic anhydride and then esterifying the intermediate using a mixture of alcohols.

Other compounds which may be used in the automotive fluid applications in the oil medium include acrylic polymers such as polyacrylic acid and sodium polyacrylate, high-molecular-weight polymers of ethylene oxide such as Polyox® WSR from Union Carbide, cellulose compounds such as carboxymethylcellulose, polyvinyl alcohol (PVA), polyvinyl pyrrolidone (PVP), xanthan gums and guar gums, polysaccharides, alkanolamides, amine salts of polyamide such as Disparlon AQ series from King Industries, hydrophobically modified ethylene oxide urethane (e.g., Acrysol series from Rohmax), silicates, and fillers such as mica, silicas, cellulose, wood flour, clays (including organoclays) and nanoclays, and resin polymers such as polyvinyl butyral resins, polyurethane resins, acrylic resins and epoxy resins.

Chemical compounds such as plasticizers can also be used in the automotive fluid applications and may be selected from the group including phthalate, adipates, sebacate esters, and more particularly: glyceryl tri(acetoxystearate), epoxidized soybean oil, epoxidized linseed oil, N,n-butyl benzene sulfonamide, aliphatic polyurethane, epoxidized soy oil, polyester glutarate, polyester glutarate, triethylene glycol caprate/caprylate, long chain alkyl ether, dialkyl diester glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12/PEG-65 lanolin oil, dialkyl adipate, alkylaryl phosphate, alkyl diaryl phosphate, modified triaryl phosphate, triaryl phosphate, butyl benzyl phthalate, octyl benzyl phthalate, alkyl benzyl phthalate, dibutoxy ethoxy ethyl adipate, 2-ethylhexyldiphenyl phosphate, dibutoxy ethoxy ethyl formyl, diisopropyl adipate, diisopropyl sebacate, isodecyl oleate, neopentyl glycol dicaprate, neopenty glycol diotanoate, isohexyl neopentanoate, ethoxylated lanolins, polyoxyethylene cholesterol, propoxylated (2 moles) lanolin alcohols, propoxylated lanoline alcohols, acetylated polyoxyethylene derivatives of lanoline, and dimethylpolysiloxane. Other plasticizers which may be substituted for and/or used with the above plasticizers including glycerine, polyethylene glycol, dibutyl phthalate, and 2,2,4-trimethyl-1,3-pentanediol monoisobutyrate, and diisononyl phthalate all of which are soluble in a solvent carrier.

Physical Agitation

The physical mixing includes high shear mixing, such as with a high speed mixer, homogenizers, microfluidizers, a Kady mill, a colloid mill, etc., high impact mixing, such as attritor, ball and pebble mill, etc., and ultrasonication methods.

Ultrasonication is the most preferred physical method in the instant invention since it is less destructive to the carbon nanostructure structure than the other methods described. Ultrasonication can be done either in the bath-type ultrasonicator, or by the tip-type ultrasonicator. More typically, tip-type ultrasonication is applied for higher energy output. Sonication at the medium-high instrumental intensity for up to 30 minutes, and usually in a range of from 10 to 20 minutes is desired to achieve better homogeneity.

One dismembrator useful for preparing the instant invention is a Model 550 Sonic dismembrator manufactured by Fisher Scientific Company, located in Pittsburgh Pa. The instruction manual Publication No. FS-IM-2 published in November of 1996 describing the use of the Fisher Scientific Model 550 Sonic Dismembrator is hereby incorporated by reference. The generator power supply conversst conventional 50/60 Hz AC line power to 20 kHZ electrical energy which is fed to the converter where it is transformed to mechanical vibration. The heart of the convertor is a lead zirconate titanate (Piezoelectric) crystal which, when subjected to an alternating voltage, expands and contracts. The convertor vibrates in the longitudinal direction and transmits this motion to the horn tip immersed in the liquid solution. Cavitation results, in which microscopic vapor bubbles are formed momentarily and implode, causing powerful shock waves to radiate throughout the sample from the tip face. Horns and probes amplify the longitudinal vibration of the convertor; higher amplification (or gain) results in more intense cavitational action and greater disruption. The larger the tip of the probe, the larger the volume that can be processed but at lesser intensity. The convertor is tuned to vibrate at a fixed frequency of 20 kHZ. All horns and probes are resonant bodies, and are also tuned to vibrate at 20 kHZ. Of course it is contemplated that other models and competing ultrasonic mixing devices could be utilized in accordance with the present invention.

The raw material mixture may be pulverized by any suitable known dry or wet grinding method. One grinding method includes pulverizing the raw material mixture in the fluid mixture of the instant invention to obtain the concentrate, and the pulverized product may then be dispersed further in a liquid medium with the aid of the dispersants described above. However, pulverization or milling reduces the carbon nanostructure average aspect ratio.

The instant method of forming a stable suspension of nanostructures in a solution consist of two primary steps. First select the appropriate dispersant for the carbon nanostructure and the medium, and dissolve the dispersant into the liquid medium to form a solution, and second add the carbon nanostructure into the dispersant containing solution while strongly agitating, ball milling, or ultrasonication of the solution.

The present invention is further described and illustrated in the following examples:

EXAMPLES

Example 1

| Components | Description | Weight percentage |
|---|---|---|
| Carbon nanostructure | Surface untreated, aspect ratio 2000, diameter 25 nm, length 50 μm | 0.1 |
| Dispersant | Lubrizol ™ 9802A | 4.8 |
| Liquid | Poly(a-olefin), 6 cSt | 95.1 |
| Sonication | Fisher Scientific 550 Sonic Dismembrator, 15 minutes | |

Example 2

| Components | Description | Weight percentage |
| --- | --- | --- |
| Carbon nanostructure | Surface untreated, aspect ratio 2000, diameter 25 nm, length 50 μm | 0.1 |
| Dispersant | Lubrizol ™ 4999 | 4.8 |
| Liquid | Poly(a-olefin), 6 cSt | 95.1 |
| Sonication | Fisher Scientific 550 Sonic Dismembrator, 15 minutes | |

Example 3

| Components | Description | Weight percentage |
| --- | --- | --- |
| Carbon nanostructure | Surface untreated, aspect ratio 2000, diameter 25 nm, length 50 μm | 0.1 |
| Dispersant | OLOA 9061 | 4.8 |
| Liquid | Poly(a-olefin), 6 cSt | 95.1 |
| Sonication | Fisher Scientific 550 Sonic Dismembrator, 15 minutes | |

Example 4

| Components | Description | Weight percentage |
| --- | --- | --- |
| Carbon nanostructure | Surface treated | 0.1 |
| Dispersant | Igepal ™ CO-630 | 5.0 |
| Liquid | Water | 94.9 |
| Sonication | Fisher Scientific 550 Sonic Dismembrator, 15 minutes | |

The dispersions in Examples 1-4 are very uniform, and will remain in a stable dispersion without any sign of separation or aggregation for at least a year.

It is contemplated that substitute dispersants could be utilized in the examples set forth in Examples 1-4 and yield yield similar results. For instance, in Example 1 up to 4.8 weight percent of a zinc dithiophosphate could be substituted for the LUBRIZOL 9802A since it is the primary active ingredient of the product. In Example 2, up to 4.8 weight percent of a zinc alkyldithiophosphate could be substituted for the LUBRIZOL 4999 product and be expected to yield similar results since a zinc alkyldithiophosphate is the active ingredient in the LUBRIZOL 4999 product. In Example 3, up to 4.8 weight percent a zinc alkyl dithiophosphate compound could be substituted for the OLOA 9061 since the alkyl dithiophosphate compound is the active ingredient in the OLOA 9061 product. Finally, in Example 4, up to 5.0 weight percent of a nonylphenoxy poly(ethyleneoxy) ethanol, branched compound could be substituted fro the IGEPAL CO-630 product since the nonylphenoxy poly(ethyleneoxy) ethanol, branched compound is the primary active ingredient in the IGEPAL CO-630 product. Moreover, the weight percent of the carbon nanostructure can be up to 10 weight percent, and more preferably up to 1 weight percent and most preferably from 0.01 to 1 weight percent in the formulations depending upon the preferred viscosity and chemical and physical properties of the resulting products. Accordingly the weight percent of the liquid medium can be reduced and the weight percent of the dispersant can be increased up to 20 weight percent, more preferably from 0.01 to 10 weight percent and most preferably from 3 to 6 weight percent. The amount of nanostructures, dispersant, and liquid medium can be varied as long as the desired HBL value is maintained to produce compounds having a gel, grease, or wax type consistency.

Shock Absorber Fluid Composition Containing Nanostructures

In a simplified version, a shock absorber consists of a tube or cylinder filled with oil, which acts as a hydraulic fluid, and a piston, which is not physically connected to any part of the tube, that slides up and down within that tube, pushing its way through the oil. The piston is connected to one end of the shock absorber via a steel rod, the tube is connected to the other. The shock absorber may be one utilized in industry for any mechanical application requiring controlled damping between mechanical linkages.

In the automotive industry which includes cars, trucks, mobile machinery, motorcycles, trailers, aircraft and other forms of transporation and load support, etc., one use for a shock absorber is to connect one end of the shock absorber to the frame of the vehicle while the other end is connected to the wheel hub (or to a swing arm that is connected to the hub), or other load bearing member. Thus, when the wheel or other load bearing member hits a bump in the road and moves the swing arm upwards toward the vehicle frame, the piston of the shock absorber is pushed through the oil. The oil provides resistance to the movement of the piston which slows it down. In the process kinetic energy is converted to heat. The oil in these tubes would totally stop the movement of the piston were it not for the existence of a valve in the piston that allowed the fluid to pass through it. This is because the oil cannot itself be compressed. That valve can be made to allow fluids to flow faster in one direction than the other.

One of the critical characteristics of a shock absorber oil is the high viscosity index (VI). Viscosity index is the relationship of viscosity to the temperature of a fluid. It is determined by measuring the kinematic viscosities of the oil at 40 and 100° C., and using the tables or formulas included in ASTM D 2270. High viscosity index fluids display lesser a degree of change in viscosity with temperature than low viscosity index fluids. The reason for using a high viscosity index for a shock absorber oil is that a lot of heat is generated when the shock absorber is functioning as described in the previous paragraph. If the viscosity changes too much with temperature, the shock absorber won function consistently at all and the operator will experience a rough ride. High viscosity index of a shock absorber oil is achieved by very high loading of the viscosity modifiers (VM). Viscosity modifier is a lubricant additive, usually a polymer, whose function is to provide beneficial rheological properties to lubricating oils, such as reducing the tendency of an oil viscosity to change with temperature.

The utilization of nanostructures in shock absorber fluids to create a nanofluid provides a composition having improved performance capabilities. The shock absorber nanofluid composition is a fluid with nanometer-sized particles dispersed uniformly inside the fluid. The significant advantage of nanofluid comes in twofold:

1) The thickening effect of nanoparticles in a fluid doesn't show as much temperature dependence as the polymers used as viscosity modifier because the nanoparticles inherently possess a higher viscosity index than a conventional viscosity modifier typically used in lubricating oils. Mathematically, the viscosity index of a shock absorber fluid containing nanoparticles or nanostructures can be compared by plotting the log of viscosity of the oil(s) versus temperature. The flatter the plotted line, the higher the viscosity index. FIG. 1 is a graph illustrating the viscosity index of a nanofluid shock absorber oil is greater than that of a conventional shock absorber fluid without nanoparticles.

2) The high thermal conductivity of a nanofluid is another great benefit when it is used as a shock absorber oil. Normally solid materials have higher thermal conductivity than liquid materials. The effect on thermal conductivity of adding solid nanoparticles into a fluid is much more than an addition effect, as demonstrated by U.S. Pat. No. 6,221,275 B1 incorporated in its entirety herein. The higher thermal conductivity enables the fluid to handle the temperature change better when the shock absorber is actively functioning.

As described previously, the incorporation of nanostructures into the shock absorber fluid is a multi-step process. It includes pulverizing the solid material into micro-powders (if the material is in bulk form to start with), and wet-milling the micro-powders with the solvent used in shock absorber oil (a typical example is VISTA LPA 210) for several hours, and then adding the viscosity modifier into the mixture and continuing the milling for another several hours. The final mixture is a paste, which is diluted by the solvent (such as VISTA LPA 210) and treated by small amounts of other additives (such as defoamer, seal sweller, antiwear agent, etc.). Table 1 illustrates a typical formulation of a nanofluid shock absorber oil, and Table 2 illustrates that of a conventional shock absorber oil as comparison.

TABLE 1

Typical formulation of a nanofluid shock absorber oil

| Ingredient | Percent by weight |
| --- | --- |
| Graphite nanostructures | 2.14 |
| VISTA LPA 210 | 78.80 |
| LUBRIZOL 7720C | 18.55 |
| LUBRIZOL 5186B | 0.21 |
| Tricresyl phosphate | 0.15 |
| F-655C defoamer | 0.14 |

TABLE 2

Typical formulation of a conventional shock absorber oil

| Ingredient | Percent by weight |
| --- | --- |
| VISTA LPA 210 | 62.40 |
| LUBRIZOL 7720C | 36.87 |
| LUBRIZOL 5186B | 0.30 |
| Tricresyl phosphate | 0.22 |
| F-655C defoamer | 0.20 |
| Blue Dye | 0.01 |

Of course the blue dye is optional and not considered to be of material significance or not necessary to provide a the formulas set forth in Tables 1-2 and is not critical. Other dispersant packages can be substituted for the LUBRIZOL 7720 package and or 5186B package. The shock absorber fluid by VISTA LPA 210 can be replaced with any compatible conventional fluid commercially available.

It is contemplated that the incorporation of nanostructures is applicable to brake fluid and/or power steering fluid as well.

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. Reference to documents made in the specification is intended to result in such patents or literature cited are expressly incorporated herein by reference, including any patents or other literature references cited within such documents as if fully set forth in this specification. The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

The invention claimed is:

1. A method of preparing a stable dispersion of carbon nano particles in a liquid, comprising the steps of:
   dissolving a dispersant comprising a surfactant having a low hydrophile-lipophile balance (HLB) value of 8 or less in an amount of from 0.001 to 30.0 percent, into a major amount of a liquid medium selected from the group consisting of a mineral oil, a hydrogenated oil, a vegetable oil, a synthetic oil, and combinations thereof forming a dispersant liquid medium;
   adding carbon nano material having an aspect ratio of from 500 to 5,000 in an amount of from 0.01 to 10.0 percent by weight into said dispersant liquid medium with mechanical agitation;
   forming a uniform suspension of colloidal size solid particles; and
   adding said uniform suspension of colloidal size solid particles to a shock absorber fluid forming a nanofluid.

2. A method of preparing a stable dispersion of carbon nano particles in a liquid, comprising the steps of:
   dissolving a dispersant in an amount of from 0.001 to 30.0 percent comprising a surfactant having a low hydrophile-lipophile balance (HLB) value of 8 or less into a major amount of a liquid medium selected from the group consisting of a mineral oil, a hydrogenated oil, a vegetable oil, a synthetic oil, and combinations thereof forming a dispersant liquid medium;
   adding carbon nano material having an aspect ratio of from 500 to 5000 in an amount of from 0.01 to 10.0 percent by weight into said dispersant liquid medium with ultrasonification;
   forming a uniform suspension of colloidal size solid particles; and
   adding said uniform suspension of collidal size solid particles to a shock absorber fluid forming a nanofluid.

3. The method according to claim 1, including the step of adding a plasticizer.

4. The method according to claim 3, wherein said plasticizer is selected from the group consisting of a phthalate, an adipate, a sebacate ester, a glyceryl tri(acetoxystearate), an epoxidized soybean oil, an epoxidized linseed oil, a N,n-butyl benzene sulfonamide, an aliphatic polyurethane, a polyester glutarate, a triethylene glycol, a caprate/caprylate, a long chain alkyl ether, a dialkyl diester glutarate, a monomeric polymer, a polyester based on adipic acid, a hydrogenated dimer acid, a distilled dimer acid, a polymerized fatty acid trimer, an ethyl ester of hydrolyzed collagen, an isostearic acid, a sorbian oleate, a cocoyl hydrolyzed keratin, a lanolin oil, a dialkyl adipate, an alkylaryl phosphate, an alkyl diaryl phosphate, a modified triaryl phosphate, triaryl phosphate, a butyl benzyl phthalate, an octyl benzyl phthalate, an alkyl benzyl phthalate, a dibutoxy ethoxy ethyl adipate, a 2-ethyl-hexyldiphenyl phosphate, a dibutoxy ethoxy ethyl formyl, a diisopropyl adipate, a diisopropyl sebacate, an isodecyl oleate, a neopentyl glycol dicaprate, a neopenty glycol diotanoate, an isohexyl neopentanoate, an ethoxylated lanolin, a polyoxyethylene cholesterol, a propoxylated (2 moles) lanolin alcohol, a propoxylated lanoline alcohol, an acetylated polyoxyethylene derivative of lanoline, a dimethylpolysiloxane, a glycerine, a polyethylene glycol, a dibutyl phthalate, a 2,2,4-trimethyl-1,3-pentanediol monoisobutyrate, a diisononyl phthalate, and combinations thereof.

\* \* \* \* \*

UNITED STATES PATENT AND TRADEMARK OFFICE
CERTIFICATE OF CORRECTION

PATENT NO. : 7,470,650 B2
APPLICATION NO. : 10/966825
DATED : December 30, 2008
INVENTOR(S) : Zhiqiang Zhang et al.

It is certified that error appears in the above-identified patent and that said Letters Patent is hereby corrected as shown below:

Column 1, line 10 "1. Technical Field" to -- Technical Field --.
Column 1, line 18 "2. Description of the Prior Art" to -- Description of the Prior Art --.
Column 1, line 28 "nanostructures used in the present invention has a" to -- nanostructures used in the present invention have a --.
Column 2, line 35 ""dispersant" is general accepted" to -- "dispersant" is generally accepted --.
Column 2, line 42 "a stable particle-containing dispersions" to -- a stable particle-containing dispersion --.
Column 3, line 37 "additive package typical sold in" to -- additive package typically sold in --.
Column 4, line 10 "shock absorber fluid" to -- shock absorber fluid. --.
Column 4, line 34 "to achieve certain level of" to -- to achieve a certain level of --.
Column 4, line 66 "products Synthetic lubricating" to -- products. Synthetic lubricating --.
Column 6, line 1 "about 2-40 centistoke" to -- about 2-40 centistokes --.
Column 6, line 2 "of 4 and 10 centistoke" to -- of 4 and 10 centistokes --.
Column 6, line 21 "Di-2-ethylhexyl" to -- di-2-ethylhexyl --.
Column 6, line 36 "2-460 centistoke" to -- 2-460 centistokes --.
Column 7, line 16 "also be utilizes as" to -- also be utilized as --.
Column 7, line 51 "N-substitued" to -- N-substituted --.
Column 10, line 2 "Model 550 Sonic dismembrator" to -- Model 550 Sonic Dismembrator --.
Column 11, line 47 "yield yield similar results" to -- yield similar results --.
Column 11, line 61 "substituted fro the" to -- substituted for the --.
Column 12, line 51 "shock absorber won function" to -- shock absorber won't function --.
Column 13, line 60 "to provide a the formulas" to -- to provide the formulas --.

Signed and Sealed this
Thirty-first Day of January, 2012

David J. Kappos
*Director of the United States Patent and Trademark Office*